Oct. 25, 1927.

A. DE W. GRITMAN 1,646,749

DENTAL APPARATUS

Original Filed March 9, 1925   3 Sheets-Sheet 1

WITNESS:
Robt P Kitchel

INVENTOR
Abel DeWitt Gritman
BY
William J. Jackson
ATTORNEY

Oct. 25, 1927.  1,646,749

A. DE W. GRITMAN

DENTAL APPARATUS

Original Filed March 9, 1925   3 Sheets-Sheet 3

WITNESS:

INVENTOR

Abel DeWitt Gritman

BY

ATTORNEY

Patented Oct. 25, 1927.

1,646,749

UNITED STATES PATENT OFFICE.

ABEL DE WITT GRITMAN, OF PHILADELPHIA, PENNSYLVANIA.

DENTAL APPARATUS.

Application filed March 9, 1925, Serial No. 13,956. Renewed March 3, 1927.

This invention, generally stated, relates to dental apparatus and has more especial relation to a device for the automatic grinding of artificial teeth as positioned in a "case", in order to procure desired smoothness or evenness of the articulation thereof.

The leading object of the present invention is to provide a device of the character stated for the automatic grinding of the articulating surfaces of artificial teeth as positioned in a "case" in which is combined simplicity, efficiency, cheapness and numerous adjustable movements for attaining desired results. Other and further objects reside in the provision of general details of construction and arrangement and combination of parts for attaining the results sought by the leading object. Other and still further objects of the present invention not at this time more specifically pointed out will be referred to hereinafter.

The invention consists of the novel construction hereinafter described and finally claimed.

The nature, characteristic features and scope of the invention will be more fully understood from the following description taken in connection with the accompanying drawings forming part hereof, and in which.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as hereinafter shown and described.

Figure 1:
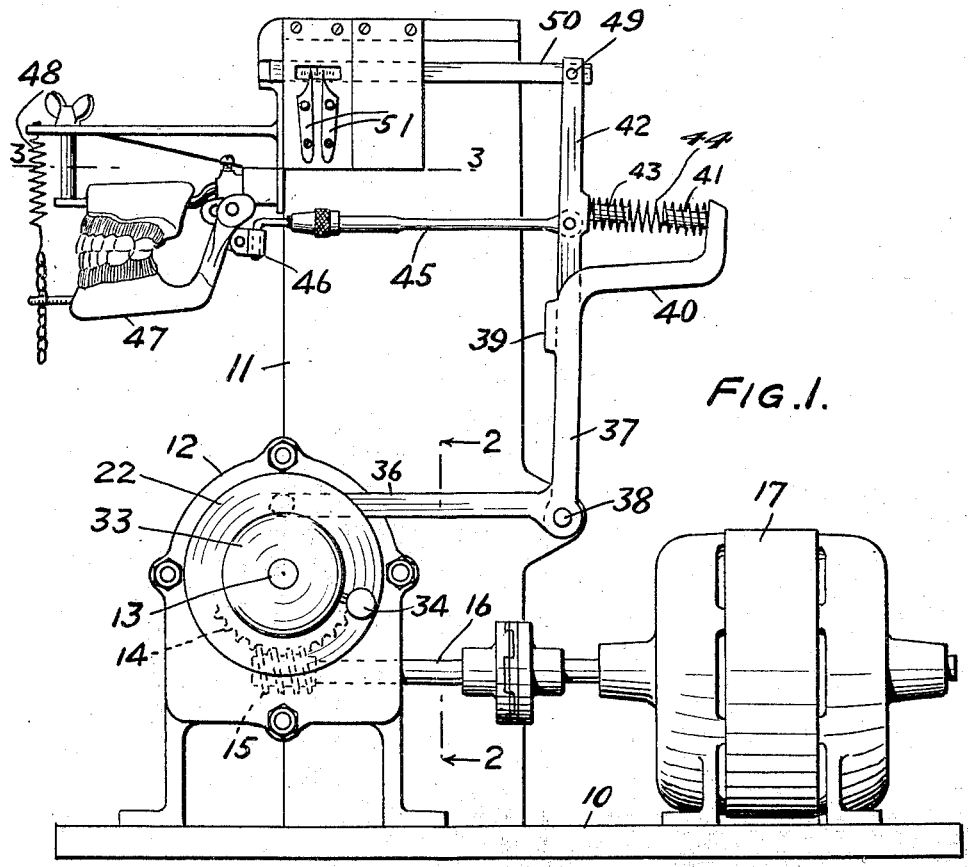
Fig. 1, is a view in side elevation of apparatus embodying the invention.
Figure 2:
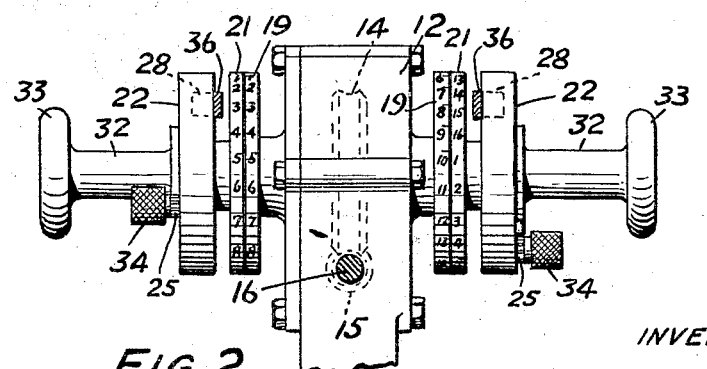
Fig. 2, is a view in cross-section taken upon the line 2—2 of Fig. 1.
Figure 3:
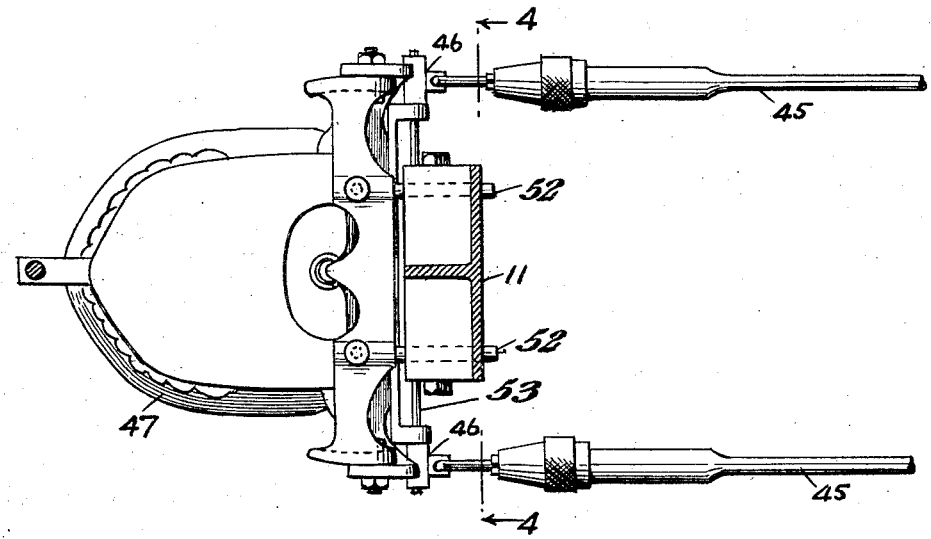
Fig. 3, is a fragmentary view, in plan, of the parts shown in Fig. 1.
Figure 4:
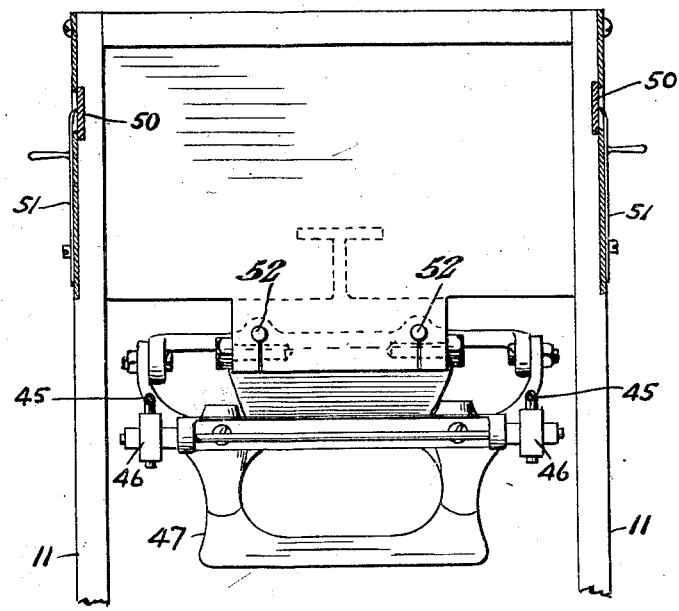
Fig. 4, is a view in section, taken upon the line 4—4 of Fig. 3.
Figure 5:
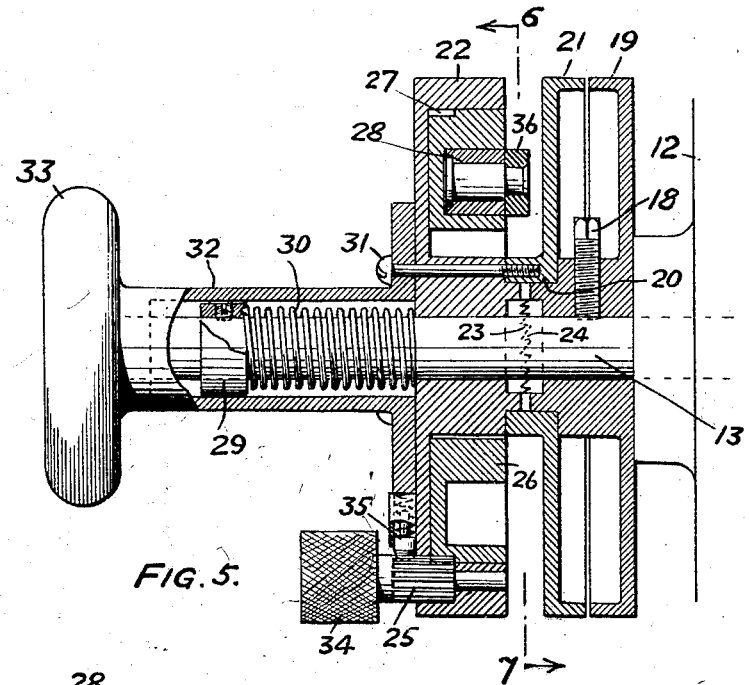
Fig. 5, is a fragmentary view in section of the left hand side of Fig. 2.
Figures 6, 7:
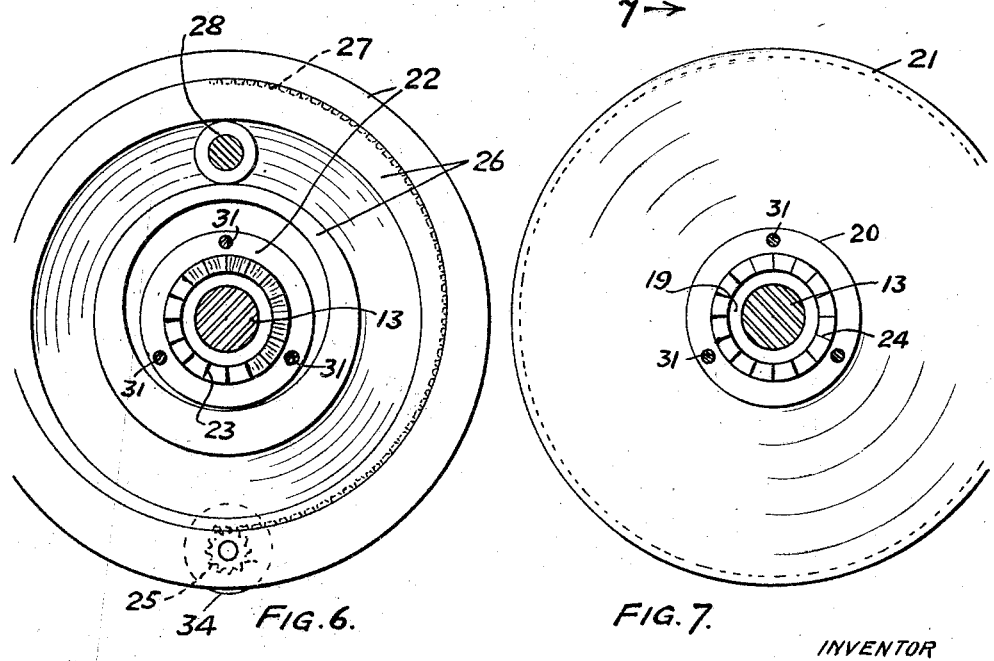
Fig. 6, is a view in section taken upon the line 6—7 of Fig. 5.
Fig. 7, is a view in section taken upon the same line but looking in the opposite direction.

Referring to the drawings in detail the reference numeral 10 designates a base rising from which are standards 11. Supported upon base 10 is a housing 12 supported by, which is a laterally disposed, constantly driven, horizontal shaft 13. Fixed to shaft 13 is a worm wheel 14 meshing with which is a worm 15 fixed to a horizontally disposed, longitudinally arranged drive shaft 16, operatively connected, for continuous drive, with an electric motor 17, operated from any suitable source. Upon each side of housing 12 and upon shaft 13 are arranged parts as best seen in Figs. 5 to 7 inclusive and since these parts are duplicates a description of but one side will suffice. Fixed to shaft 13 by a set screw 18 is an annulus 19 peripherally graduated as shown in Fig. 2. Movably mounted upon the hub 20 of said annulus is a second annulus 21. Mounted on shaft 13 is an annular dished housing 22 mounted in which is a toothed wheel 25. The inner face of housing 22 is notched as at 23 and the outer face of annulus 19 is notched as at 24, which notched parts co-operate to maintain the parts 22—19 rotatively connected. Within housing 22 and upon shaft 13 is an eccentric 26 provided with an exteriorly toothed rim 27 in mesh with wheel 25. By the turning of wheel 25 the cam face of the eccentric 26 may be moved about its horizontal axis to change its relative center with respect to shaft 13 to increase or decrease the throw of eccentric pin 28 the purpose of which will presently appear. There is thus provided a disc and an eccentric within an eccentric. Fixed to shaft 13 is a collar 29 and a coiled spring 30 is interposed between said collar and the outer face of housing 22 to maintain parts 23—24 interlocked. Fixed to both housing 22 and annulus 21 by screws 31 is a flanged sleeve 32 having a hand wheel 33. Thus the hand wheel 33 may be moved about its axis to shift sleeve 32, housing 22 and annulus 21 with respect to annulus 19 to procure a desired adjustment of housing 22 and thereafter by moving handle 34 the eccentric pin 28 may be caused to vertically reciprocate to a greater or less degree according to the adjustment of the eccentric 26. A detent 35 is provided to prevent undue movement of toothed wheel 25, see Fig. 5. Connecting with eccentric pin 28 is a bell-crank lever 37 pivoted at 38 to standard 11, see Fig. 1. The upper extension of said lever is provided with a lip 39 and an L-shaped extension 40 having a pin 41. Also pivoted upon same pivot point 38 is a lever 42 which abuts against lip 39 and as eccentric pin 28 is moved vertically, bell-crank lever 37 is rocked thus moving inwardly and outwardly lever 42 which is provided with a pin 43, a spring 44 connecting pins 41—43. The spring 44 serves to take up shocks and vibrations. Pivotally connecting with each lever 42 is a rod 45 and these two rods, one upon each side of the device, pivotally connect with sockets 46 of a device 47 for holding artificial teeth comprising a so-called "case" of upper and lower teeth. The device is provided with a pair of extension rods 52 which extend through apertures in the supporting structure to maintain the device in proper position. The device is also provided with a pivotal cross-bar 53 by which the sockets 46 are supported. The parts of this device, which is fully shown and described in Letters Patent granted under date of July 25, 1899, and numbered 629,531, are capable of various movements with respect to each other for grinding of the articulations of artificial teeth. According to the arrangement of parts just described I am enabled to secure the automatic movement of these parts which is highly desirable as is readily apparent. In practice the upper and lower sets of teeth are kept in abutting position under spring tension as at 48. It is obvious that in accordance with the adjustment of the eccentrics upon shaft 13 varied jaw movements may be obtained for the parts of device 47 and it is believed further description thereof need not be entered into. Connected pivotally as at 49 to lever 42 is a rod 50 the outer end of which is graduated and pointers 51 are present whereby calculation of the proper throw of rods 45 may be had.

It is apparent that an articulator may thus be operated by power, which articulator is capable of many adjustments for reproducing varied grinding movements of the human mandible.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. A device of the character stated comprising a supporting structure, means carrying upper and lower sets of artificial teeth supported by said structure, a laterally extended shaft, means for constantly driving said shaft, a pair of eccentrics upon each side operable from said shaft and means including a pair of bell-crank levers each having an L-shaped and cushioned end operatively arranged between said eccentrics and said means for causing one of said sets of teeth to function as a grinding agent with respect to the other of said sets of teeth.

2. A device of the character stated comprising a supporting structure, means carrying upper and lower sets of artificial teeth supported by said structure, said teeth being maintained in abutting relation under spring tension, a laterally extended shaft, means for constantly driving said shaft, a pair of eccentrics upon each side operable from said shaft and means including a pair of bell-crank levers each having an L-shaped and cushioned end operatively arranged between said eccentrics and said means for causing one of said sets of teeth to function as a grinding agent with respect to the other of said sets of teeth.

3. A device of the character stated comprising a supporting structure, means carrying upper and lower sets of artificial teeth supported by said structure, a laterally extended shaft, means for constantly driving said shaft, a pair of eccentrics upon each side operable from said shaft, means for independently adjusting the throw of said eccentrics, and means including a pair of bell-crank levers each having an L-shaped and cushioned end operatively arranged between said eccentrics and said means for causing one of said sets of teeth to function as a grinding agent with respect to the other of said sets of teeth.

4. A device of the character stated comprising a supporting structure, means carrying upper and lower sets of artificial teeth supported by said structure, a laterally extended shaft, means for constantly driving said shaft, a pair of eccentrics upon each side operable from said shaft, and means including a pair of cushioned bell-crank levers operatively arranged between said eccentrics and said means for causing one of said sets of teeth to function as a grinding agent with respect to the other of said sets of teeth.

5. A device of the character stated comprising a supporting structure, means carrying upper and lower sets of artificial teeth supported by said structure, a laterally extended shaft, means including a worm wheel and worm for constantly driving said shaft, a pair of eccentrics upon each side operable from said shaft, and means including a pair of bell-crank levers each having an L-shaped and cushioned end operatively arranged between said eccentrics and said means for causing one of said sets of teeth to function as a grinding agent with respect to the other of said sets of teeth.

6. A device of the character stated comprising a supporting structure, means carrying upper and lower sets of artificial teeth supported by said structure, a laterally extended shaft, means for constantly driving said shaft, a pair of eccentrics upon each side operable from said shaft, means including a pair of bell-crank levers each having an L-shaped and cushioned end operatively arranged between said eccentrics and said means for causing one of said sets of teeth to function as a grinding agent with respect to the other of said sets of teeth, and means including hand wheels upon each side of said device for independently moving said eccentrics about their centers to vary the throw thereof.

7. A device of the character stated comprising a supporting structure, means carrying upper and lower sets of artificial teeth supported by said structure, a laterally extended shaft, means for constantly driving said shaft, a pair of eccentrics upon each side operable from said shaft, means operatively including a pair of bell-crank levers each having an L-shaped and cushioned end arranged between said eccentrics and said means for causing one of said sets of teeth to function as a grinding agent with respect to the other of said sets of teeth, means including hand wheels upon each side of said device for independently moving said eccentrics about their centers to vary the throw thereof, and spring pressed detents for maintaining adjusted positions of said eccentrics.

In testimony whereof, I have hereunto signed my name.

ABEL DE WITT GRITMAN.